Patented Aug. 28, 1945

2,383,647

UNITED STATES PATENT OFFICE 2,383,647

METHOD OF WATERPROOFING INORGANIC HYDROUS OXIDE BODIES, AND PRODUCT

Ernst A. Hauser, Cambridge, Mass., assignor to Research Corporation, New York, N. Y., a corporation of New York No Drawing. Application March 13, 1942,
Serial No. 434,629

23 Claims. (Cl. 117—123)

In the development of Alsifilm I have disclosed first, in my Patent No. 2,266,636, the production of films and other solid bodies, of inorganic hydrous oxides having the essential characteristics of bentonite, i. e. colloidal, crystalline inorganic hydrous oxides which contain structural water and are capable of swelling when brought into contact with water to form plastic hydrogels and exhibit base exchange properties. Sodium bentonite consisting principally of the clay mineral montmorillonite, is a typical inorganic hydrous oxide of this sort. Second, in my Patent No. 2,266,637, I have disclosed a process for rendering such inorganic hydrous oxide bodies nonswelling or insoluble in water by treating the same with salts containing cations having ionic diameters of at least about 2.6 Angstrom units. Third, in my application Serial No. 386,743, filed April 3, 1941, I have disclosed a process of insolubilizing and waterproofing Alsifilm by treating it with a salt having a cation which has an ionic diameter of at least about 2.6 Angstrom units and an anion containing from 1 to 6 carbon atoms, said salt being capable of forming a basic salt upon being heated. Treatment of the Alsifilm with such salts serves not only to render it non-swelling but also improves its humidity resistance and electrical properties. Said application discloses lead acrylate as a member of said group of compounds, the cation of which has an ionic diameter of at least about 2.6 Angstrom units and the anion of which contains from 1 to 6 carbon atoms and is capable of forming an insoluble basic salt upon being heated, but I have now found that lead acrylate belongs to another group or subgroup of compounds capable of waterproofing Alsifilm, that is, salts, the cations of which, such as K, Rb, Cs, Ba, Sr, Pb, Tl, Au, $NH_3$ and substituted ammonia (ethyl amine, ethylene diamine, diethylene triamine, etc.) have a diameter of at least about 2.6 Angstrom units and the anions of which are capable of polymerization, such as acrylic acid, methyl acrylic acid, vinyl acetic acid, vinyl acrylic acid and substituted acids of this type. The salts of such acids in their monomeric state may be dissolved in suitable solvents and the solutions employed for waterproofing Alsifilm e. g. by soaking the Alsifilm in the solution, draining and/or washing, drying and storing, heating or baking to bring about polymerization of the incorporated salt.

The result of this treatment of the Alsifilm is that it is rendered water-insoluble and non-swelling, presumably as a result of the replacement of sodium or other hydratable cation by the lead or other cation having an ionic diameter of at least about 2.6 Angstrom units, and water and humidity resistant, presumably as a result of the incorporation of the highly hydrophobic polymerized anions into the film structure.

An important characteristic of the treating salts of the present invention is that in their monomeric or unpolymerized state they are soluble in water or other suitable solvents such as methyl and ethyl alcohol and are able to penetrate into and become incorporated in the Alsifilm. Once the monomeric salt has been incorporated in the Alsifilm, the Alsifilm can be dried, stored and heated or baked in an oven to effect polymerization of the salt within the hydrous oxide structure. Because of the hydrophobic properties of the polymerized salt, the hydrous oxide body is stable to washing or soaking in water and also highly resistant to water pick-up from a humid atmosphere.

The solvent for the treating salt may be any polar solvent which is capable of dissolving a high concentration of the treating salt, preferably a concentration of at least about 30% by weight at a relatively low temperature of say up to about 25° C. A high concentration of the treating salt in the treating solution is desirable. In the case of lead acrylate for instance, when using water as the solvent, it is advisable to carry out the treatment with the solution at least nearly saturated at an elevated temperature e. g. about 70° C.

The invention is illustrated by the following specific examples:

(1) Lead acrylate

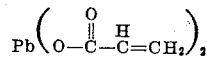

was prepared by dissolving lead carbonate in a concentrated aqueous solution of monomeric acrylic acid. Needle-like crystals were obtained from the resulting solution by concentration by evaporation of the water content. The crystals were separated and air dried and then 3.70 g. dissolved in every 10 cc. of water at a temperature of 70° C. Films of bentonite were then immersed in the lead acrylate solution maintained at about 75° C. for a period of 6 hours. The time of treatment and solution temperature are not critical. It is important, however, that a highly concentrated solution be employed. The films were removed from the solution, drained and placed in an oven at 110° for four hours. The temperature of the oven was then gradually raised to 150° C. and the films baked at this temperature for 20 hours to insure complete polymerization of the acrylate. It will be appreciated that the baking schedule is not critical as to either time or temperature so long as the film is not blistered by a too rapid vaporization of the water picked up by the film while being soaked in the solution of lead acrylate and is not fused or burned or carbonized. On the other hand, it is essential that the lead acrylate be polymerized by this heat treatment. For example, the baking temperature may be gradually raised from 100° C. to 175° C. in a baking treatment lasting for about 7 days.

(2) Lead methacrylate was prepared by reacting lead carbonate with methacrylic acid in aqueous solution, lead methacrylate crystallized by evaporating the solution, dissolved in water, and the resulting solution used as a treating bath for Alsifilm which was then dried and baked, all as described in connection with the use of lead acrylate in Example 1.

Films prepared as described in the foregoing examples were found to possess excellent properties for use as electrical insulation. They are sufficiently heat-resistant for most electrical insulation purposes and have excellent insulating properties which are retained to a high degree when the films are subjected to a humid atmosphere. The moisture pick-up when subjected to a humid atmosphere was practically negligible and so small that it could not be accurately measured by weighing on an analytical balance. The moisture pick-up of the lead acrylate treated film after being exposed to an atmosphere at 93% relative humidity for 10 days was found to be not more than about 0.1%. Lead acrylate films immersed in water for 24 hours showed a negligible moisture pick-up but after six days' immersion in water the moisture pick-up amounted to from 0.5 to 1.5%. No change in the physical condition of the film could be detected after six days' immersion in water.

Electrical tests on lead acrylate treated film both before and after immersion in water gave the following results:

| Sample | Condition | Power factor 60 cycles | D. C. resistance ohms [1] |
|---|---|---|---|
|  |  | Percent |  |
| 1 | Room humidity for 1 week | 1 | 5×10¹⁰ |
| 2 | Immersion in water 24 hours | 4 | 8×10⁹ |

[1] Resistance measured with a 1 inch diameter steel electrode. Thickness of sample 3.3 mils (.0033″).

(3) The procedure of Example 1 was repeated, using barium carbonate instead of lead carbonate to the production of barium acrylate which was used as described in said example to treat Alsifilm.

Aqueous acrylic acid (60% by weight) was added to 400 cc. of a water solution of diethylene triamine containing 200 cc. of commercial product. Enough acrylic acid solution was added to make the resulting solution neutral (about 400 cc.). The acid was added slowly in order to avoid overheating the solution. At no time was the temperature allowed to rise above 70° C. To this solution was added 5 g. of carbon black after which it was filtered using a suction flask. After cooling to room temperature the filtrate was used as a waterproofing bath for Alsifilm.

Crude Alsifilm was immersed in this bath for a period of 12 hours. The films were then removed, washed free of excess treating solution, and then dried at 110° C. for 3 hours. Following this preliminary drying the films were placed in a 150° C. oven for 24 hours. The finished films were found to have good electrical and humidity resistant properties. They exhibited exceptionally good resistance to tracking.

Without limiting the invention to any theory as to how or why the Alsifilm is rendered waterproof and resistant to water pick-up by the described treatment, it may be said that the cation of the treating salt, by base exchange, replaces the hydratable cation of the hydrous oxide (principally sodium in the case of bentonite) by a non-hydratable cation which, due to its size relative to the size of the openings or spaces in the silicon-oxygen sheet of the hydrous oxide, serves to bond the hydrous oxide unit parcels together and thereby prevent swelling of the hydrous oxide body when contacted with water. The cation of the treating salt does not, however, prevent water from entering the hydrous oxide structure, i. e. it does not prevent moisture pick-up. The polymerizable organic anion of the treating salt which is bonded to the cation yields, when polymerized, a highly hydrophobic water-insoluble material which seals the hydrous oxide film structure against the entrance of water and thus gives the film its low moisture pick-up characteristics. The high temperature of the solutions of the treating salts employed favors high concentration of the solution and thus favors impregnation and incorporation of relatively large amounts of the treating salt into the hydrous oxide structure.

That the Alsifilm products produced by treatment with a polymerizable salt are of a different character from those produced by treatment with waterproofing salts capable of forming basic salts but not capable of polymerization is shown by comparative data of the moisture pick-up of the respective products. Whereas films treated with lead acetate, lead propionate, lead butyrate, lead valerate and lead isovalerate and heated at 150° C. for 24 hours to form the basic salts, after exposure to an atmosphere at room temperature and a relative humidity of 93 to 94% for 24 hours gained 9.25%, 2.80%, 1.20%, 1.85%, and 1.70% of moisture respectively, films similarly treated with lead acrylate gained only 0.10% of moisture upon exposure to an atmosphere at room temperature and at 93% humidity for 240 hours. In 240 hours films treated with lead butyrate and lead isovalerate pick up 4–5% of moisture.

It will be understood, of course, that the anion of the treating salt should be capable of polymerization to yield a highly hydrophobic product so as to exclude moisture from the hydrous oxide structure. This property is characteristic of polymerization products of the polymerizable organic acid anions.

This application is a continuation-in-part of my application Serial No. 386,743, filed April 3, 1941, now Patent No. 2,317,685, granted April 27, 1943.

I claim:

1. Process for waterproofing bodies made of colloidal, crystalline inorganic hydrous oxides which contain structural water and are capable of swelling when in contact with water to form plastic hydrogels and have base exchange properties and the individual crystallites of which exhibit at least one surface plane in the form of a silica sheet having hexagonal voids with a diameter of the inscribed circle of about 2.6 Angstrom units which comprises contacting such a body with a solution of a salt the cation of which has an ionic diameter of at least about 2.6 Angstrom units and the anion of which contains an unsaturated carbon to carbon linkage and is capable of polymerization to a water-insoluble hydrophobic product.

2. Process as defined in claim 1 in which the treated body is baked to effect polymerization of the anion.

3. Process as defined in claim 1 in which the hydrous oxide body is in the form of a film.

4. Process as defined in claim 1 in which the hydrous oxide is bentonite.

5. Process as defined in claim 1 in which the salt is a salt of a polymerizable olefinic carboxylic acid.

6. Process as defined in claim 1 in which the salt is an acrylate.

7. Process as defined in claim 1 in which the salt is a metal acrylate.

8. Process as defined in claim 1 in which the treating salt is lead acrylate.

9. Process as defined in claim 1 in which the salt is lead methacrylate.

10. Process as defined in claim 1 in which the salt is an amine salt.

11. Process as defined in claim 1 in which the hydrous oxide body is in the form of a film formed of bentonite and is treated with a concentrated aqueous solution of lead acrylate, and the treated film is baked at a temperature high enough to effect polymerization of the acrylate.

12. Process which comprises contacting a film formed of colloidal bentonite with a substantially saturated aqueous solution of lead acrylate at a temperature of at least about 60° C. for a time of the order of at least several hours, and then baking the film at a temperature of from 100° C. to 175° C. for a period of the order of at least about 20 hours.

13. As a new product, a preformed body of a colloidal crystalline inorganic hydrous oxide, the crystal lattice of which has adsorbed the cations of a salt, which cations have an effective diameter of at least about 2.6 Angstrom units and the anions of which salt contain an unsaturated carbon to carbon linkage and are polymerized, said hydrous oxide containing structural water and being capable of swelling when in contact with water to form a plastic hydrogel and having base exchange properties and the individual crystallites thereof exhibit at least one surface plane in the form of a silica sheet having hexagonal voids with a diameter of the inscribed circle of about 2.6 Angstrom units.

14. Product as defined in claim 13 in which the inorganic hydrous oxide is bentonite.

15. Product as defined in claim 13 in which the salt is a salt of a polymerizable olefinic carboxylic acid.

16. Product as defined in claim 13 in which the salt is an acrylate.

17. Product as defined in claim 13 in which the salt is a metal acrylate.

18. Produce as defined in claim 13 in which the salt is a lead salt of a polymerizable olefinic carboxylic acid.

19. Product as defined in claim 13 in which the salt is lead acrylate.

20. Product as defined in claim 13 in which the salt is an amine salt.

21. Product as defined in claim 13 in which the inorganic hydrous oxide is bentonite and the salt is lead acrylate.

22. As a new product, a film formed of colloidal bentonite having polymerized lead acrylate incorporated therein.

23. Water-insoluble non-hygroscopic material exhibiting high dielectric properties, consisting of macromolecules composed of a colloidal crystalline inorganic hydrous oxide chemically combined by base exchange reaction with a salt the cations of which have a diameter of at least about 2.6 Angstrom units and the anions of which are polymerized olefinic carboxylic organic acid radicals, said hydrous oxide containing structural water and being capable of swelling when in contact with water to form a plastic hydrogel and having base exchange properties and the individual crystallites thereof exhibit at least one surface plane in the form of a silica sheet having hexagonal voids with a diameter of the inscribed circle of about 2.6 Angstrom units.

ERNST A. HAUSER.